United States Patent
Petrosino

(10) Patent No.: US 12,497,222 B2
(45) Date of Patent: Dec. 16, 2025

(54) CAP ASSEMBLY AND METHODS OF USING THE SAME

(71) Applicant: INTEGRATED LINER TECHNOLOGIES, INC., Rensselaer, NY (US)

(72) Inventor: Paul Petrosino, Slingerlands, NY (US)

( * ) Notice: Subject to any disclaimer, the term of this patent is extended or adjusted under 35 U.S.C. 154(b) by 0 days.

(21) Appl. No.: 19/065,040

(22) Filed: Feb. 27, 2025

(65) Prior Publication Data

US 2025/0242982 A1 Jul. 31, 2025

Related U.S. Application Data

(63) Continuation of application No. PCT/US2024/023290, filed on Apr. 5, 2024.

(60) Provisional application No. 63/494,979, filed on Apr. 7, 2023.

(51) Int. Cl.
*B65D 51/18* (2006.01)
*B65D 51/00* (2006.01)

(52) U.S. Cl.
CPC ........... *B65D 51/18* (2013.01); *B65D 51/002* (2013.01); *B65D 2251/0015* (2013.01); *B65D 2251/0093* (2013.01)

(58) Field of Classification Search
None
See application file for complete search history.

(56) References Cited

U.S. PATENT DOCUMENTS

| | | | | |
|---|---|---|---|---|
| 4,499,148 A | * | 2/1985 | Goodale | B29C 65/08 156/275.5 |
| 4,635,807 A | * | 1/1987 | Knapp | B65D 51/002 215/247 |
| 4,773,552 A | | 9/1988 | Boege et al. | |
| 5,219,083 A | * | 6/1993 | Liebert | B65D 51/002 220/DIG. 19 |
| 5,647,939 A | * | 7/1997 | Gee | B29C 66/73755 156/308.6 |
| 5,707,589 A | * | 1/1998 | Fullemann | G01N 35/1079 422/537 |
| 6,234,335 B1 | * | 5/2001 | Gee | B29C 66/5346 604/905 |
| 2007/0066941 A1 | | 3/2007 | Tezuka et al. | |
| 2011/0278254 A1 | | 11/2011 | Petrosino et al. | |
| 2012/0024085 A1 | * | 2/2012 | Faulkner | B01L 3/50825 422/63 |

(Continued)

OTHER PUBLICATIONS

Dow Corning brand primers, prime coats and adhesion promoters. 1999 (4 pages).

(Continued)

*Primary Examiner* — Peter A Salamon
(74) *Attorney, Agent, or Firm* — Hodgson Russ LLP

(57) ABSTRACT

The present disclosure provides for a cap assembly for use with a vial, the cap assembly comprising: an outer cap defining a central cavity, an upper opening, and a lower opening; an inner cap defining a central cavity, wherein the inner cap is secured at least partially within the outer cap's central cavity; and a liner disposed within the outer cap's central cavity between the outer cap's upper opening and an upper edge of the inner cap, wherein the liner extends across the outer cap's upper opening. Further provided herein are methods of using the same.

28 Claims, 14 Drawing Sheets

(56) References Cited

U.S. PATENT DOCUMENTS

| | | | |
|---|---|---|---|
| 2013/0171030 A1* | 7/2013 | Ferlic | A61M 39/20 |
| | | | 422/294 |
| 2013/0333796 A1* | 12/2013 | Py | A61J 1/1425 |
| | | | 141/1 |
| 2016/0159535 A1 | 6/2016 | Diaz et al. | |
| 2018/0353378 A1 | 12/2018 | Py | |
| 2019/0092555 A1 | 3/2019 | Ma et al. | |
| 2021/0261309 A1* | 8/2021 | Schennink | B65D 85/505 |
| 2022/0203360 A1* | 6/2022 | Jung | B01L 3/50825 |
| 2024/0190620 A1* | 6/2024 | Petrosino | B65D 41/0478 |

OTHER PUBLICATIONS

Shoemaker, J.A. and Tettenhorst, D.R., Method 537.1: Determination of Selected Per- and Polyfluorinated Alkyl Substances in Drinking Water by Solid Phase Extraction and Liquid Chromatography/Tandem Mass Spectrometry (LC/MS/MS), EPA document #: EPA/600/R-18/352, Version 1.0. Nov. 2018.

* cited by examiner

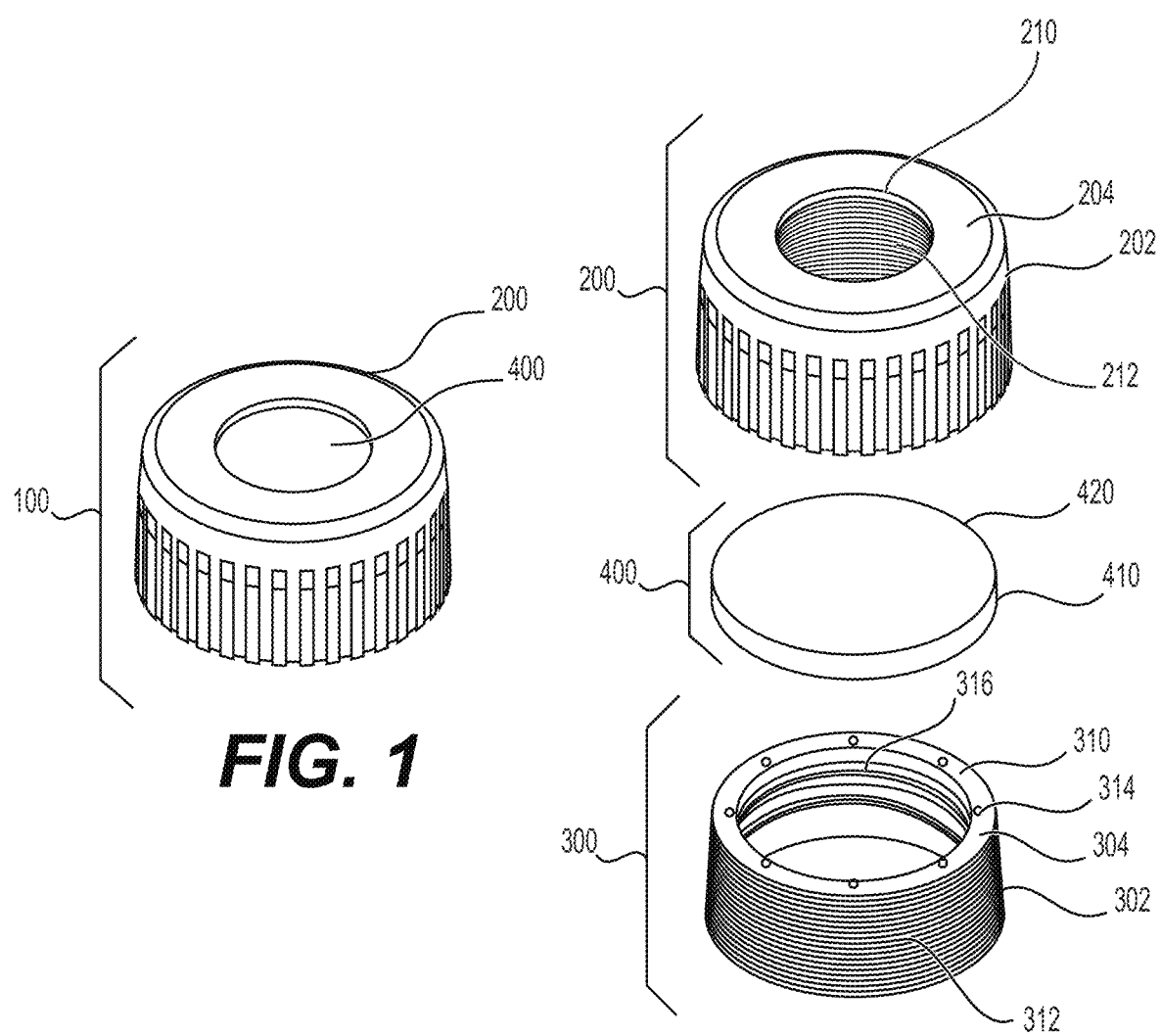

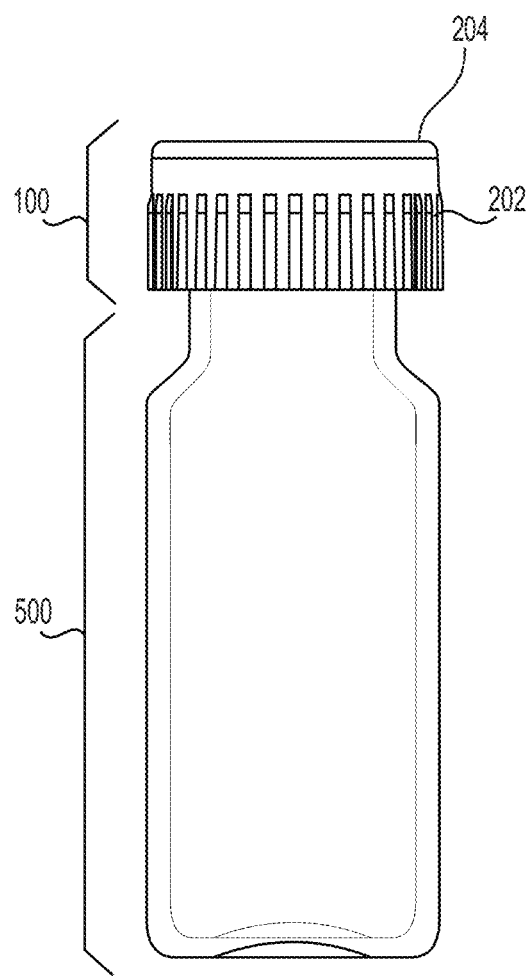 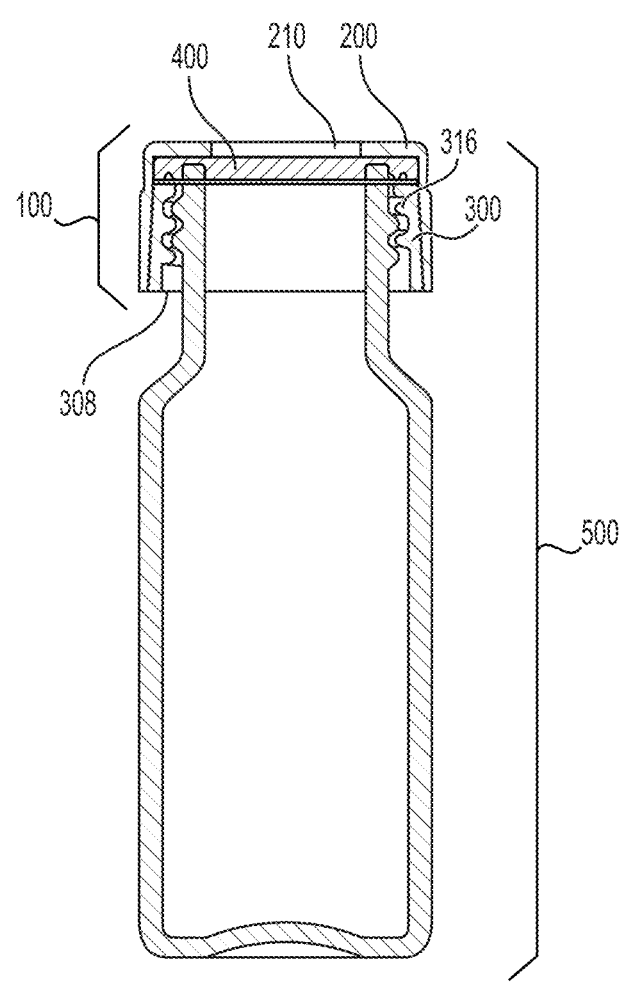
FIG. 26  FIG. 27

CAP ASSEMBLY AND METHODS OF USING THE SAME

CROSS-REFERENCE TO RELATED APPLICATIONS

This application is a continuation of PCT International Application No. PCT/US2024/023290, filed on Apr. 5, 2024, which claims the benefit of priority to, and the benefit of, U.S. Provisional Application No. 63/494,979 filed on Apr. 7, 2023, the disclosures of which are hereby expressly incorporated by reference herein in their entirety.

BACKGROUND

Currently, methods of bonding liners to caps used in chromatography testing, water analysis, pollution analysis, and blood and biological fluid testing include: chemically bonding a liner to a plastic cap, crimping a cap and liner to a vial via a crimping mechanism, or holding a liner in place in a snap cap and covering a vial via a snapping mechanism. Chemical methods of bonding, for example, can prove costly and more involved than what is required for the use or stipulations and regulations surrounding a particular use. Further, there is a limit on the amount of force that can be applied to chemically bonded liners and some applications may benefit from a more robust and stronger bonding mechanism. In these situations, a user may turn to a crimping or snapping mechanism, but these mechanisms may not be strong or effective enough for the desired use.

Accordingly, there is a need for a method of securing a liner in a cap for use on a vial that meets necessary regulations and is also stronger and more economical for the desired applications. Further, there is a need for a liner securing mechanism that provides for easy interchangeability between the outer shell of a cap assembly. The apparatuses and methods disclosed herein address these and other needs.

SUMMARY

In accordance with the purposes of the disclosed materials and methods, as embodied and broadly described herein, the disclosed subject matter, in one aspect, relates to securing a liner in a cap, and methods of using thereof.

In various implementations, cap assembly for use with a vial is provided. In some implementations, the cap assembly includes an outer cap defining a central cavity, an upper opening, and a lower opening; an inner cap defining a central cavity, where the inner cap is secured at least partially within the outer cap's central cavity; and a liner disposed within the outer cap's central cavity between the outer cap's upper opening and an upper edge of the inner cap, where the liner extends across the outer cap's upper opening.

In certain implementations, an outer surface of the inner cap is configured to engage an inner surface of the outer cap to secure the inner cap at least partially within the outer cap. In certain implementations, the inner cap is friction fit at least partially within the outer cap.

In certain implementations, the outer surface of the inner cap comprises an outer knurled surface, where the inner surface of the outer cap comprises a inner knurled surface, and where the inner cap's outer knurled surface is configured to engage the outer cap's inner knurled surface to friction fit the inner cap at least partially within the outer cap. In certain implementations, the outer knurled surface of the inner cap is knurled with a plurality of annular rings, and wherein the inner knurled surface of the outer cap is knurled with a plurality of annular rings.

In certain implementations, the outer cap includes a sidewall defining the outer cap's central cavity, and the outer cap further includes an upper wall positioned at an upper end of the outer cap, where the outer cap's upper opening comprises an aperture in the outer cap's upper wall. In certain implementations, the liner is disposed between the upper wall of the outer cap and the upper edge of the inner cap.

In certain implementations, a diameter of the outer cap's upper opening is less than the diameter of the outer cap's lower opening. In certain implementations, the inner cap's central cavity comprises a cylindrical central cavity. In certain implementations, the outer cap's central cavity comprises a cylindrical central cavity. In certain implementations, an inner surface of the inner cap is threaded. In certain implementations, the upper edge of the inner cap includes one or more protrusions configured to engage the liner.

In certain implementations, the liner comprises a septum and a lower polymer layer, where the lower polymer layer comprises a first thermoplastic polymer, where the septum comprises an elastomer, and where the septum is coupled to the lower polymer layer. In certain implementations, the elastomer comprises silicone rubber.

In certain implementations, the liner further includes an upper polymer layer, where the upper polymer layer comprises a second thermoplastic polymer, further where the septum is coupled to the upper polymer layer. In certain implementations, the first thermoplastic polymer and the second thermoplastic polymer are the same. In certain implementations, the first thermoplastic polymer and the second thermoplastic polymer are different.

In certain implementations, a liquid disposed on the first thermoplastic polymer has a contact angle of from 0° to 90° with the first thermoplastic polymer. In certain implementations, a liquid disposed on the second thermoplastic polymer has a contact angle of from 0° to 90° with the second thermoplastic polymer. In certain implementations, the first thermoplastic polymer and the second thermoplastic polymer comprise polytetrafluoroethylene (PTFE). In certain implementations, the first thermoplastic polymer and the second thermoplastic polymer comprise polypropylene (PP). In certain implementations, the first thermoplastic polymer includes PTFE or PP. In certain implementations, the second thermoplastic polymer includes PTFE or PP.

In certain implementations, the liner has a thickness and a cross-sectional shape, where the cross-sectional shape is substantially circular. In certain implementations, the liner has an average characteristic dimension of from 8 millimeters (mm) to 40 mm. In certain implementations, the liner is free of perfluoroalkyl and polyfluoroalkyl substances (PFAS). In certain implementations, the liner is substantially free of PFAS. In certain implementations, the liner includes from 0 parts per trillion to 140,000 parts per trillion of PFAS. In certain implementations, the liner has a thickness of from 0.5 inches or less.

In various implementations, a cap and vial assembly is provided, where the cap assembly described with respect to any of the implementations provided herein is coupled to a vial. In certain implementations, the vial has a volume of from 1 mL to 500 mL. In various implementations, the vial includes glass. In various implementations, the glass includes borosilicate glass. In various implementations, the vial includes a plastic. In various implementations, both the cap and the vial comprise screw threads such that the cap assembly is configured to be coupled to the vial with a screw mechanism.

In various implementations a method of testing water quality in a sample using an analytical instrument is provided, where the sample is contained within a container comprising the cap assembly described with respect to any of the implementations provided herein, the method comprising penetrating the liner with a syringe to remove a portion of the sample and testing the portion of the sample using the analytical instrument. In certain implementations, the analytical instrument is a gas chromatograph, liquid chromatograph, mass spectrometer, or any combination thereof. In certain implementations, the method includes removing one or more portions of the sample by penetrating the liner with the syringe from 1 to 20 times. In certain implementations, the liner is penetrated with the syringe via an auto sampling device.

In various implementations, a method of analyzing a sample using an analytical instrument is provided, where the sample is contained within the cap assembly described with respect to any of the implementations provided herein. In certain implementations, the method includes penetrating the liner with a syringe to remove a portion of the sample and testing the portion of the sample using the analytical instrument. In certain implementations, the sample includes a biological sample. In certain implementations, the method further includes penetrating the insert with the syringe to remove a portion of the sample. In certain implementations, the method further includes removing one or more portions of the sample by penetrating the liner with the syringe from 1 to 20 times. In certain implementations, the analytical instrument is a gas chromatograph, liquid chromatograph, mass spectrometer, or any combination thereof. In certain implementations, the liner is penetrated with the syringe via an auto sampling device.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying figures, which are incorporated in and constitute a part of this specification, illustrate several aspects described below.

FIG. 1 is an upper perspective view of an example cap assembly.

FIG. 2 is an exploded view of an example cap assembly.

FIG. 26 is a side of an example cap and vial assembly.

FIG. 27 is a cutaway view of an example cap and vial assembly.

DETAILED DESCRIPTION

Figure 3:
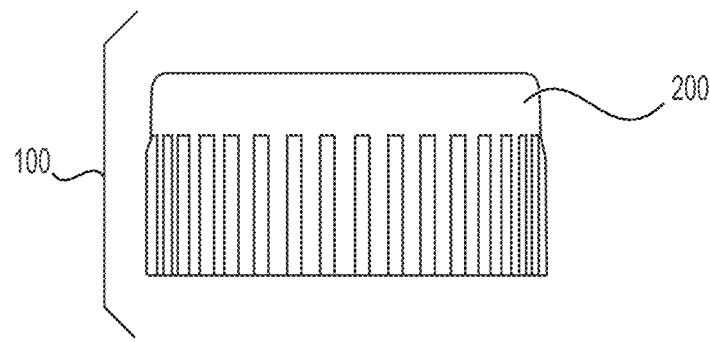
FIG. 3 is a side view of an example cap assembly.
Figure 4:
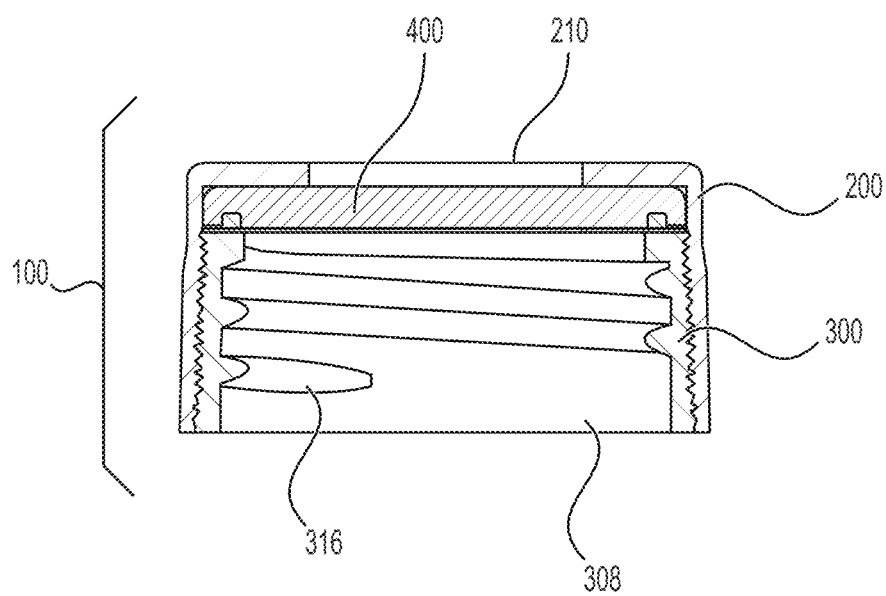
FIG. 4 is a cutaway view of an example cap assembly.

The following description of the disclosure is provided as an enabling teaching of the disclosure. Many modifications and other implementations disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific implementations disclosed and that modifications and other implementations are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As can be apparent to those of skill in the art upon reading this disclosure, each of the individual implementations described and illustrated herein has discrete components and features which may be readily separated from or combined with the features of any of the other several implementations without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It can be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Definitions

Prior to describing the various aspects of the present disclosure, the following definitions are provided and should be used unless otherwise indicated. Additional terms may be defined elsewhere in the present disclosure.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "a compound", "a composition", or "a disorder", includes, but is not limited to, two or more such compounds, compositions, or disorders, and the like.

It should be noted that ratios, concentrations, amounts, and other numerical data can be expressed herein in a range format. It can be further understood that the endpoints of each of the ranges are significant both in relation to the other endpoint, and independently of the other endpoint.

Chemical Definitions

Unless otherwise defined, all technical and scientific terms used herein have the same meaning as commonly understood by one of ordinary skill in the art to which this invention belongs.

The organic moieties mentioned when defining variable positions within the general formulae described herein (e.g., the term "halogen") are collective terms for the individual substituents encompassed by the organic moiety. The prefix $C_n$-$C_m$ preceding a group or moiety indicates, in each case, the possible number of carbon atoms in the group or moiety that follows.

As used herein, the term "alkyl" refers to saturated, straight-chained or branched saturated hydrocarbon moieties. Unless otherwise specified, $C_1$-$C_{24}$ (e.g., $C_1$-$C_{22}$, $C_1$-$C_{20}$, $C_1$-$C_{18}$, $C_1$-$C_{16}$, $C_1$-$C_{14}$, $C_1$-$C_{12}$, $C_1$-$C_{10}$, $C_1$-$C_8$, $C_1$-$C_6$, or $C_1$-$C_4$) alkyl groups are intended. Examples of alkyl groups include methyl, ethyl, propyl, 1-methyl-ethyl, butyl, 1-methyl-propyl, 2-methyl-propyl, 1,1-dimethyl-ethyl, pentyl, 1-methyl-butyl, 2-methyl-butyl, 3-methyl-butyl, 2,2-dimethyl-propyl, 1-ethyl-propyl, hexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, 1-ethyl-2-methyl-propyl, heptyl, octyl, nonyl, decyl, dodecyl, tetradecyl, hexadecyl, eicosyl, tetracosyl, and the like. Alkyl substituents may be unsubstituted or substituted with one or more chemical moieties. The alkyl group can be substituted with one or more groups including, but not limited to, hydroxyl, halogen, acetal, acyl, alkyl, alkoxy, alkenyl, alkynyl, aryl, heteroaryl, aldehyde, amino, cyano, carboxylic acid, ester, ether, carbonate ester, carbamate ester, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halides (halogens; e.g., fluorine, chlorine, bromine, or iodine). The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

The terms "amide" or "amido" as used herein are represented by the formula —C(O) $NZ^1Z^2$, where $Z^1$ and $Z^2$ can each be substitution group as described herein, such as hydrogen, an alkyl, alkenyl, alkynyl, aryl, heteroaryl, cycloalkyl, cycloalkenyl, heterocycloalkyl, or heterocycloalkenyl group described above.

The term "halide" or "halogen" or "halo" as used herein refers to fluorine, chlorine, bromine, and iodine.

"$R^1$," "$R^2$," "$R^3$," "$R^n$," etc., where n is some integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group. Unless stated to the contrary, a formula with chemical bonds shown only as solid lines and not as wedges or dashed lines contemplates each possible stereoisomer or mixture of stereoisomer (e.g., each enantiomer, each diastereomer, each meso compound, a racemic mixture, or scalemic mixture).

Product

Cap Assembly

FIG. 1 shows a cap assembly (100) according to various implementations. As discussed herein, the cap assembly (100) is configured for use as a lid for a container (e.g., a vial (112) as shown and described with respect to FIGS. 24-27). For example, in various implementations, the cap assembly (100) can be secured to an open end of the vial (112) to prevent evaporation and/or contamination of a sample contained within the vial (112). In various implementations, the cap assembly (100) is a screw-on cap configured for being screwed onto an open end of the vial (112) via screw threads.

As shown in FIGS. 1-5, the cap assembly (100) includes an outer cap (200), an inner cap (300), and a liner (400). In the illustrated implementation, the liner (400) is disposed within the outer cap's central cavity (206) and secured in place by the inner cap (300), which is inserted into the outer cap's central cavity (206) below the liner (400).

Outer Cap

FIGS. 6-11 show the outer cap (200) according to one implementation. As shown in FIGS. 6-11, the outer cap (200) includes a sidewall (202) and an upper wall (204). The walls (202, 204) define a central cavity (206) having a lower opening (208) and an upper opening (210).

In various implementations, the outer cap's central cavity (206) has a profile defined by an inner surface (212) of the sidewall (202) that is complimentary to an outer surface (312) of the inner cap (300). As a result, the inner cap (300) can be inserted into the central cavity (206). In the illustrated implementation, the central cavity (206) is a cylindrical central cavity (206) having a circular cross-section. However, in various other implementations, the sidewall (202) may have other suitable profiles (e.g., a cube having a cylindrical central cavity).

Figure 6:
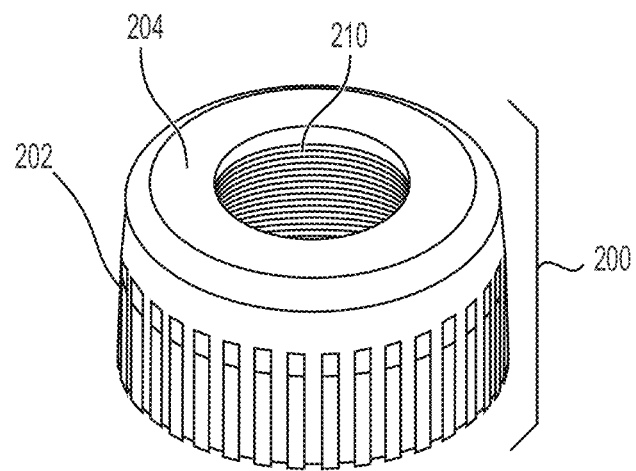
FIG. 6 is an upper perspective view of an example outer cap.
Figure 9:
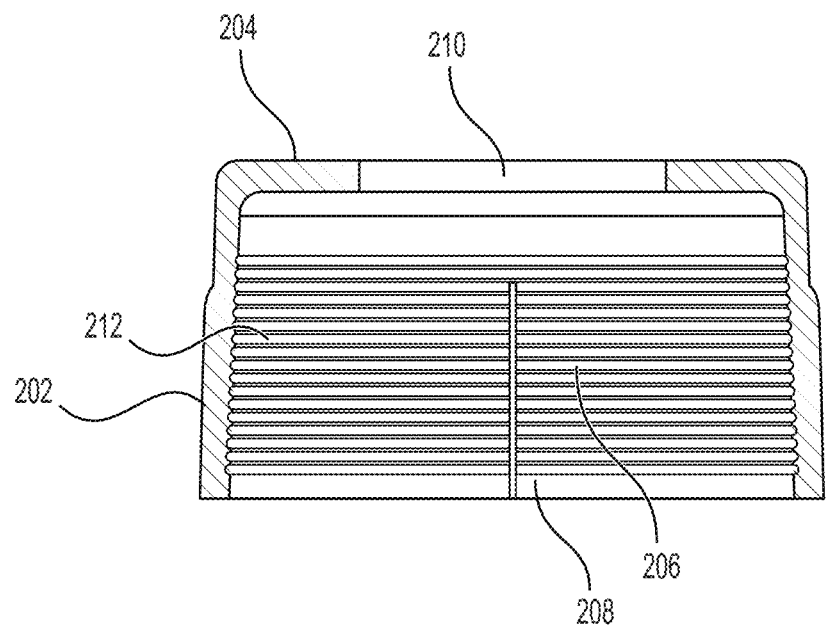
FIG. 9 is a cutaway of an example outer cap.
Figure 10:
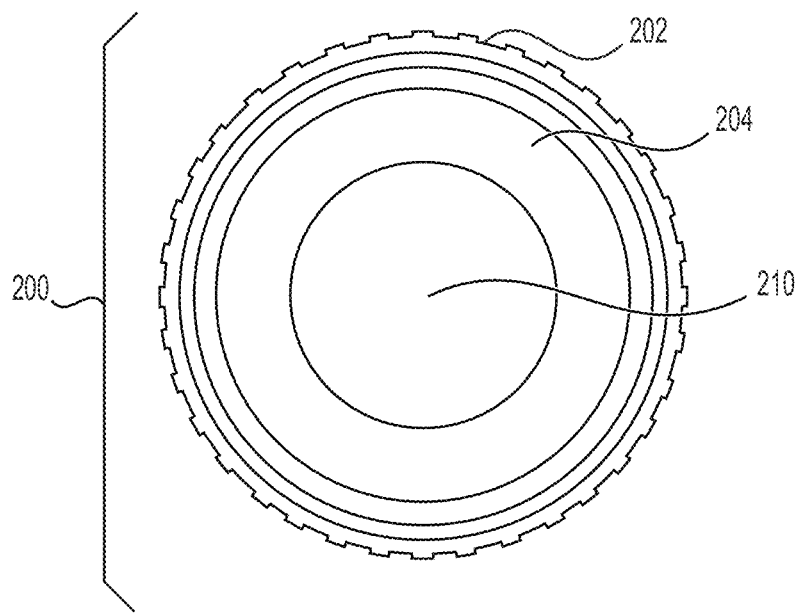
FIG. 10 is a top view of an example outer cap.

As shown in FIGS. 6, 9, and 10, the outer cap's upper opening (210) is defined by an aperture in the outer cap's upper wall (204). In the illustrated implementation, the upper opening (210) is a circular aperture in the upper wall (204). In various implementations, the upper opening (210) has a diameter that is less than the diameter of the lower opening (208).

In the illustrated implementation, the circular upper opening (210) is aligned with a central axis of the outer cap (200) and positioned concentric with the lower opening (208) (and thereby also concentric with the central cavity (206) in the illustrated implementation). However, in various other implementations, the upper opening (210) may be provided in any suitable shape and orientation.

In certain implementations, the outer cap's upper opening (210) has a cross-sectional area of from 10% to 80% of the cross-sectional area of the outer cap's central cavity (206). In certain examples, the upper opening (210) has a cross-sectional area of from 10% to 45%, or 45% to 80% of the cross-sectional area of the outer cap's central cavity (206). In specific examples, the upper opening (210) has a cross-sectional area of from 10% to 30%, 10% to 50%, or 10% to 70% of the cross-sectional area of the outer cap's central cavity (206). In some examples, the upper opening (210) has a cross-sectional area of from 10% to 20%, 20% to 30%, 30% to 40%, 40% to 50%, 50% to 60%, 60% to 70%, or 70% to 80% of the cross-sectional area of the outer cap's central cavity (206). In further examples, the upper opening (210) has a cross-sectional area of from 10% to 25%, 10% to 35%, 10% to 45%, 10% to 55%, 10% to 65%, or 10% to 75% of the cross-sectional area of the outer cap's central cavity (206). In certain examples, the upper opening (210) has a cross-sectional area of from 25% to 35%, 25% to 45%, 45% to 55%, 55% to 65%, or 65% to 75% of the cross-sectional area of the outer cap's central cavity (206).

Figure 7:
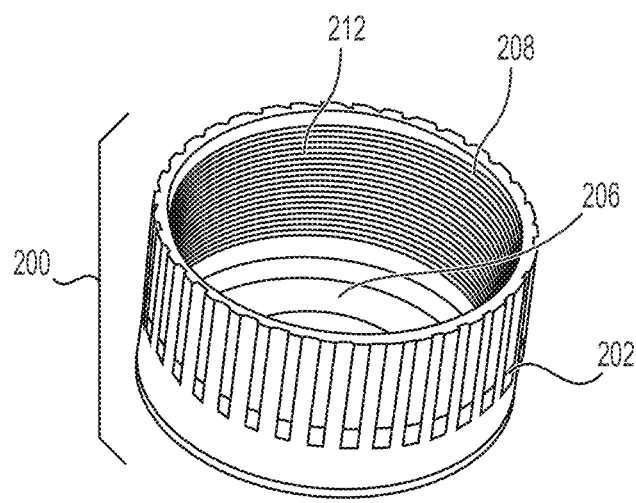
FIG. 7 is a lower perspective view of an example outer cap.
Figure 8:
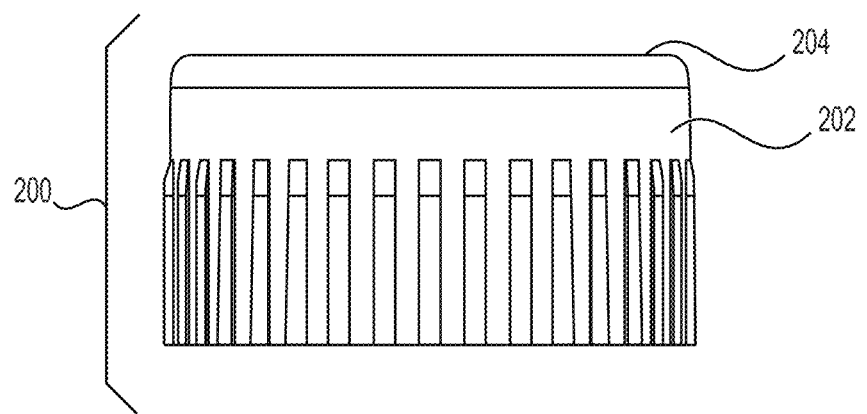
FIG. 8 is a side view of an example outer cap.
Figure 11:
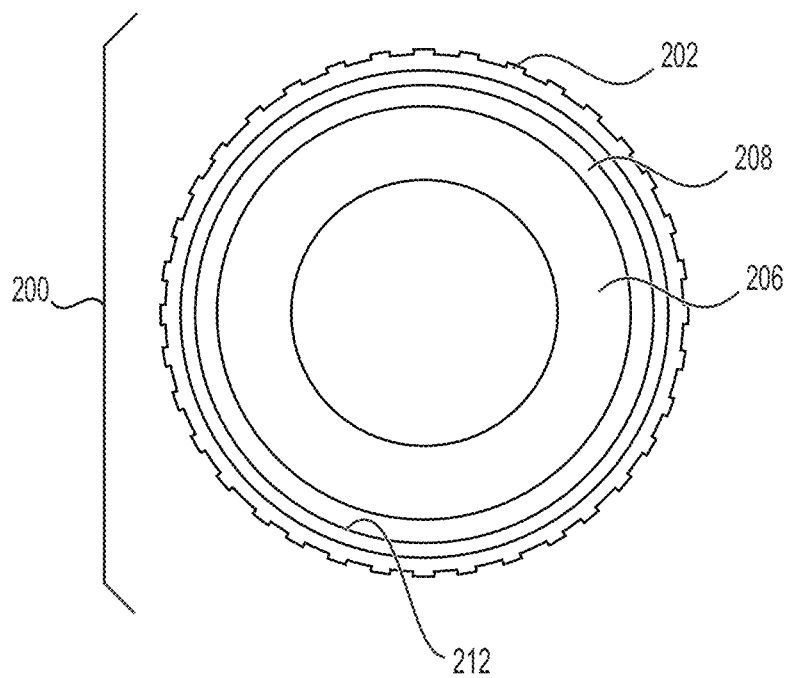
FIG. 11 is a bottom view of an example outer cap.

As shown in FIGS. 7, 9, and 11, the lower opening (208) is defined by the shape of the lower edge of the sidewall (202). In the illustrated implementation, the lower opening (208) is a circular aperture defined by the shape of the sidewall (202). As shown with respect to FIGS. 1-5, the lower opening (208) provides access to the central cavity (206) and allows the liner (400) and the inner cap (300) to be inserted within the outer cap's central cavity (206).

In the illustrated implementation, the inner surface (212) of the sidewall (202) is textured to enable the inner cap (300) to be friction fit within the outer cap's central cavity (206). In various implementations, the inner surface (212) may be knurled to define a knurled inner surface of the sidewall (202). For example, in one implementation, the inner surface (212) comprises a knurled inner surface having a plurality of annular rings extending around the central cavity (206). However, in various other implementations, other knurling or texturing techniques suitable for facilitating a friction fit may be used to impart a texture to the inner surface (212).

Inner Cap

FIGS. 12-17 show the inner cap (300) according to one implementation. As shown in FIGS. 12-17, the inner cap (300) includes a sidewall (302) defining a central cavity (306). The central cavity (306) has a lower opening (308) and an upper opening (310).

In various implementations, the inner cap's central cavity (306) has a profile defined by an inner surface (316) of the sidewall (202). In the illustrated implementation, the central cavity (306) is a cylindrical central cavity having a circular cross-section. The inner surface (316) of the sidewall (302) is threaded to enable the inner cap (300) (and thereby the cap assembly (100)) to be screwed onto a threaded opening of a container (e.g., a vial).

The inner cap's sidewall (302) also defines an outer surface (312) that is dimensioned to enable the inner cap (300) to be inserted into the outer cap's central cavity (206). In the illustrated implementation, the profile of the outer surface (312) of the inner cap (300) is complimentary to the inner surface (212) of the outer cap (300). In the illustrated implementation, the outer cap's central cavity is a cylindrical central cavity (206) having a circular cross-section and, thus, the outer surface (312) of the inner cap (300) is cylindrical. However, in various other implementations, the sidewall (302) may have other suitable profiles operable to allow the inner cap (300) to be secured to the outer cap (200) by inserting the inner cap (300) into the outer cap's central cavity (206).

In the illustrated implementation, the outer surface (312) of the sidewall (302) is textured to enable the inner cap (300) to be friction fit within the outer cap's central cavity (206). In various implementations, the outer surface (312) may be knurled to define a knurled outer surface of the sidewall (302). For example, in one implementation, the outer surface (312) comprises a knurled outer surface having a plurality of annular rings extending around the sidewall (302). However, in various other implementations, other knurling or texturing techniques suitable for facilitating a friction fit may be used to impart a texture to the outer surface (312).

Figure 12:
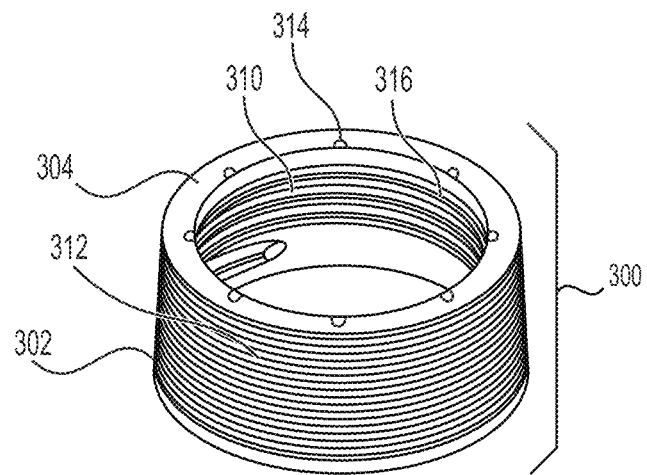
FIG. 12 is an upper perspective view of an example inner cap.
Figure 15:
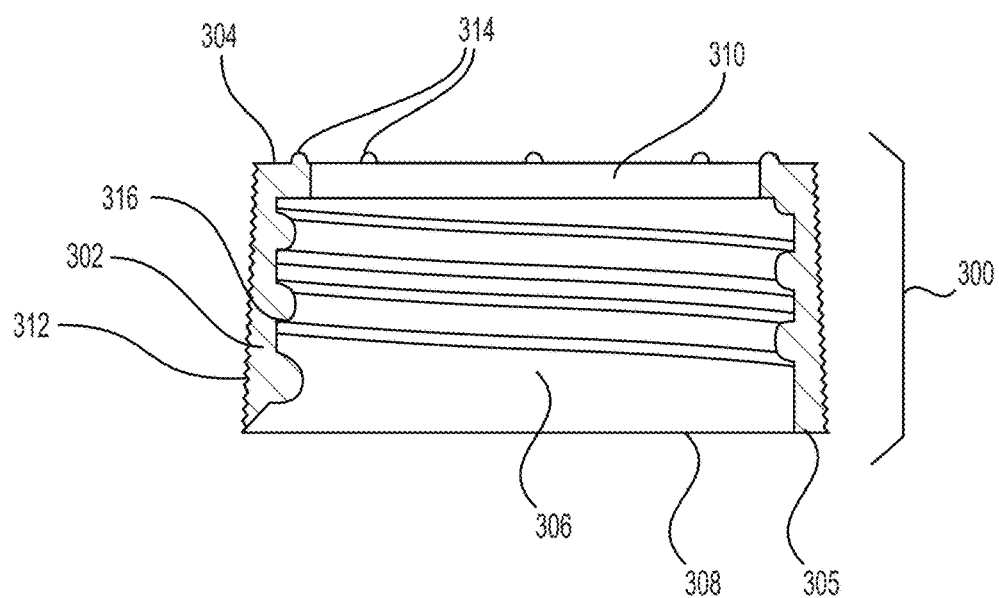
FIG. 15 is a cutaway view of an example inner cap.
Figure 16:
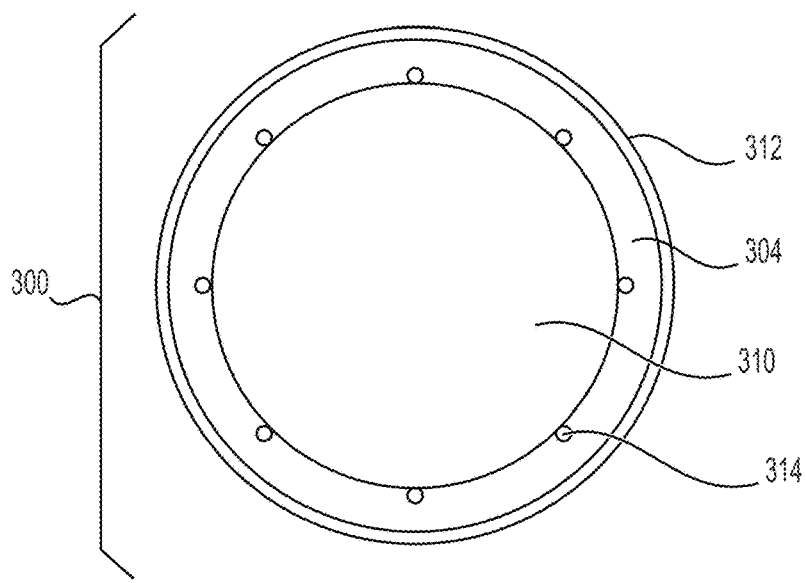
FIG. 16 is a top view of an example inner cap.

As shown in FIGS. 12, 15, and 16, the inner cap's upper opening (310) is defined by the shape of an upper edge (304) of the inner cap (300). In the illustrated implementation, the upper opening (310) is a circular aperture defined by the sidewall (302). In various implementations, the inner cap's upper opening (310) has a diameter that is substantially the same as the diameter of the lower opening (308). In the illustrated implementation, the circular upper opening (310) is aligned with a central axis of the inner cap (300) and positioned concentric with the lower opening (308) (and thereby also concentric with the central cavity 306 in the illustrated implementation).

The upper edge (304) of the inner cap (300) also defines a plurality of protrusions (314). As shown in FIGS. 5, 12, 14, 15, and 16, the protrusions (314) extend upwardly from the surface of the upper edge (304). As described herein, the protrusions (314) are configured to engage a lower surface of the liner (400) when the inner cap (300) is inserted into the outer cap's central cavity (206) to secure the liner (400) in the central cavity (206).

Figure 13:
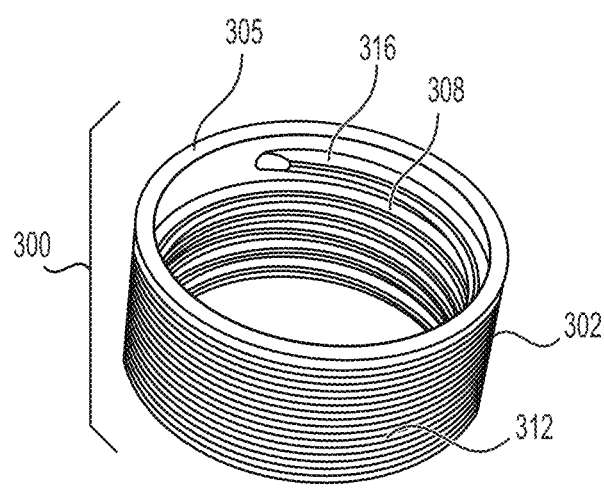
FIG. 13 is a lower perspective view of an example inner cap.
Figure 14:
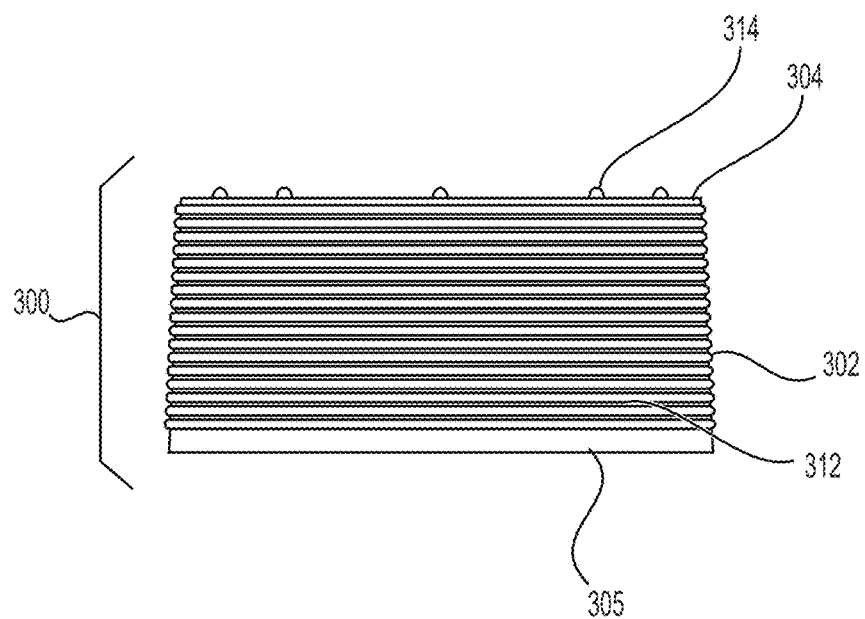
FIG. 14 is a side view of an example inner cap.
Figure 17:
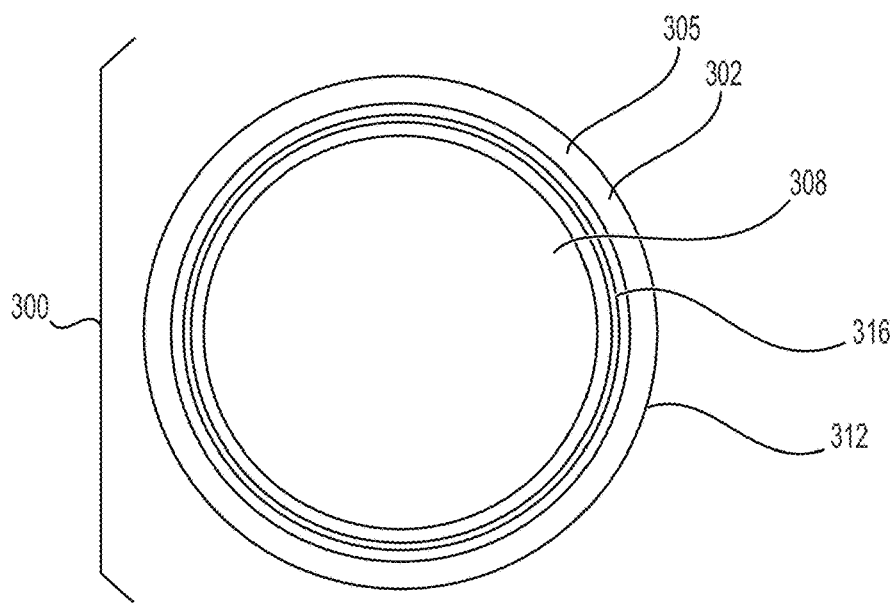
FIG. 17 is a bottom view of an example inner cap.

As shown in FIGS. 13, 15, and 17, the inner cap's lower opening (308) is defined by the shape of the lower edge (305) of the sidewall (302). In the illustrated implementation, the lower opening (308) is a circular aperture defined by the shape of the sidewall (302). As shown with respect to FIGS. 24-27, the lower opening (308) provides access to the central cavity (306) and allows the inner cap (300) (and thereby the cap assembly (100)) to be screwed onto the threaded opening of a container.

While the inner cap (300) has been shown and described as being friction fit within the outer cap (200), in various other implementations the inner cap (300) may be configured to be secured within the outer cap's central cavity (206) using other features. For example, in some implementations the inner cap (300) may be configured to be secured within the outer cap (200) using a grooved locking mechanism or threading.

In various implementations, the inner cap (300) can have an inner diameter with an average characteristic dimension of 8 millimeters (mm) or more (e.g., 8 mm, or more, 9 mm or more, 10 mm or more, 11 mm or more, 12 mm or more, 13 mm or more, 14 mm or more, 15 mm or more, 16 mm or more, 17 mm or more, 18 mm or more, 19 mm or more, 20 mm or more, 21 mm or more, 22 mm or more, 23 mm or more, 24 mm or more, 25 mm or more, 26 mm or more, 27 mm or more, 28 mm or more, 29 mm or more, 30 mm or more, 31 mm or more, 32 mm or more, 33 mm or more, 34 mm or more, 35 mm or more, 36 mm or more, 37 mm or more, 38 mm or more, 39 mm or more). In some examples, the cap (300) can have an inner diameter with an average characteristic dimension of 40 mm or less (e.g., 39 mm or less, 38 mm or less, 37 mm or less, 36 mm or less, 35 mm or less, 34 mm or less, 33 mm or less, 32 mm or less, 31 mm or less, 30 mm or less, 29 mm or less, 28 mm or less, 27 mm or less, 26 mm or less, 25 mm or less, 24 mm or less, 23 mm or less, 22 mm or less, 21 mm or less, 20 mm or less, 19 mm or less, 18 mm or less, 17 mm or less, 16 mm or less, 15 mm or less, 14 mm or less, 13 mm or less, 12 mm or less, 11 mm or less, or 10 mm or less). The average characteristic dimension of the inner cap (300) can range from any of the minimum values described above to any of the maximum values described above. For example, the inner cap (300) can have an average characteristic dimension of from 8 millimeters (mm) to 40 mm (e.g., from 8 to 12 mm, from 12 to 15 mm, from 15 to 18 mm, from 18 to 21 mm, from 21 to 24 mm, from 24 to 27 mm, from 27 to 30 mm, from 9 to 15 mm, from 9 to 18 mm, from 9 to 21 mm, from 9 to 24 mm, from 9 to 27 mm, from 9 to 30 mm, from 20 to 22 mm, from 20 to 24 mm, from 20 to 26 mm, from 20 to 28 mm, from 20 to 30 mm, from 22 to 23 mm, from 23 to 24 mm, from 24 to 25 mm, from 25 to 26 mm, from 16 to 18 mm, from 16 to 20 mm, from 16 to 22 mm, from 16 to 24 mm, from 18 to 19 mm, from 19 to 20 mm, from 20 to 21 mm, from 21 to 22 mm, from 30 mm to 40 mm, from 32 mm to 40 mm, from 30 mm to 35 mm, or from 35 mm to 40 mm). In some examples, the inner cap (300) has an average characteristic dimension of 24 mm. In further examples, the inner cap (300) has an average characteristic dimension of 20 mm.

The term "characteristic dimension," as used herein, refers to the largest straight-line distance between two points in the plane of the cross-sectional shape. "Average characteristic dimension" generally refers to the statistical mean characteristic dimension. For example, when the inner cap (300) has a cross-sectional shape that is substantially circular, the average characteristic dimension can refer to the average inner diameter, which is used herein interchangeably with "diameter." For an inner cap (300) with no screw threads, average diameter can refer to the inner diameter of the inner cap (300). For an inner cap (300) with screw threads (316), average diameter can refer to the largest straight-line distance between two points on the inside of the screw threads (316).

Liner

Figure 18:
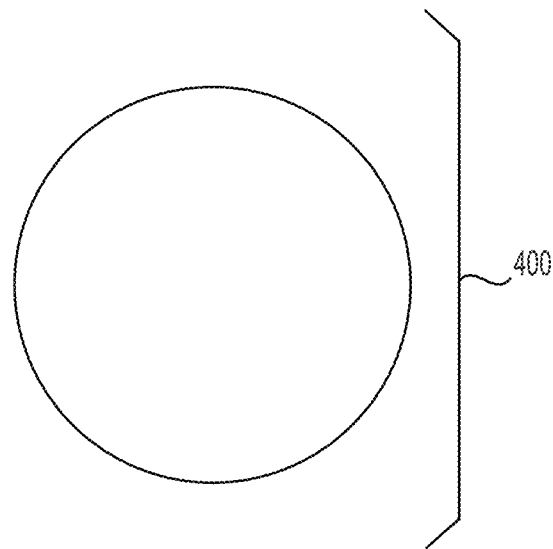
FIG. 18 is a top view of an example liner.
Figure 19:
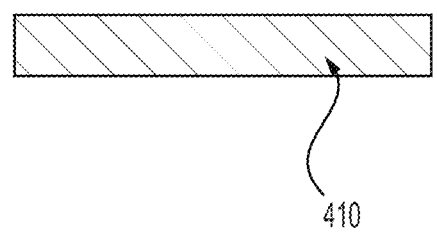
FIG. 19 is a side view of an example liner.
Figure 20:
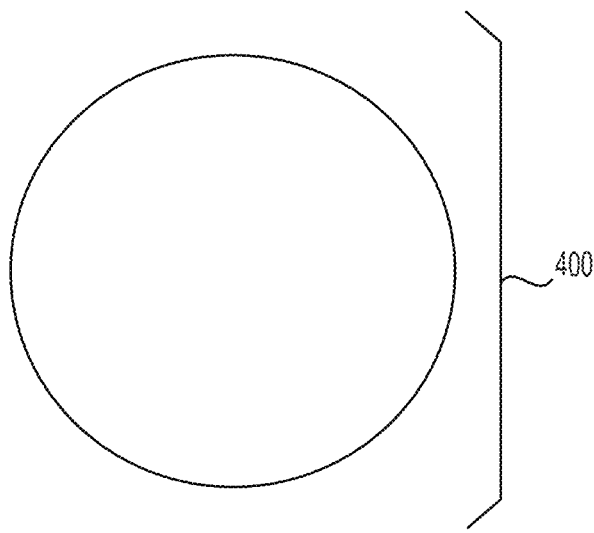
FIG. 20 is a top view of an example liner with a lower polymer layer.
Figure 21:
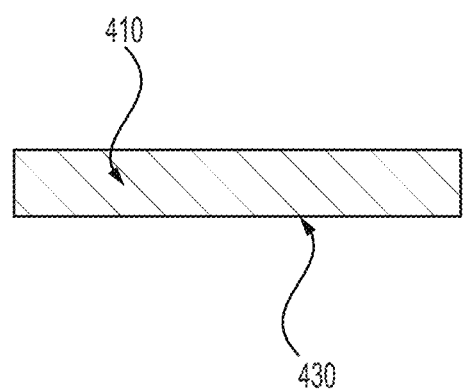
FIG. 21 is a side view of an example liner with a lower polymer layer.
Figure 22:
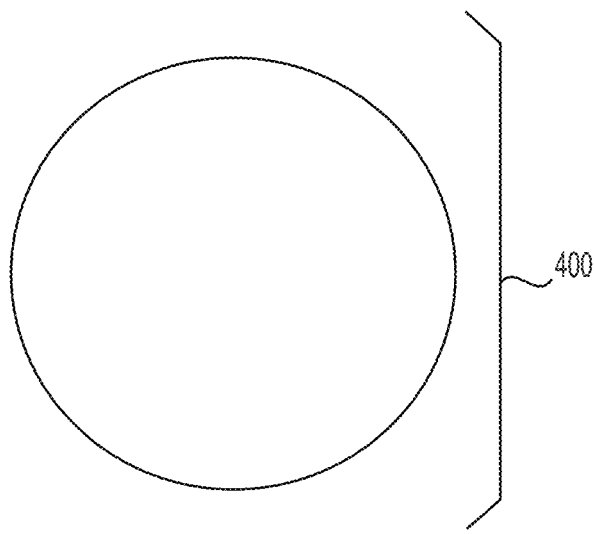
FIG. 22 is a top view of an example liner with an upper polymer layer and a lower polymer layer.
Figure 23:
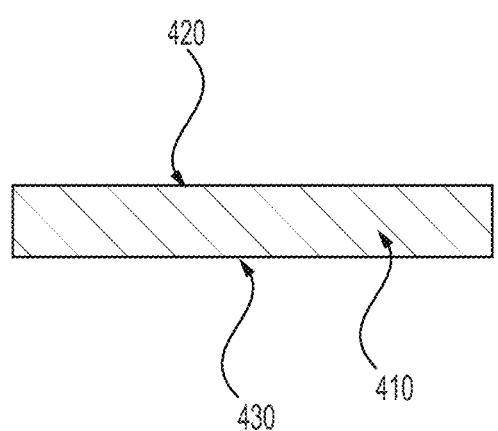
FIG. 23 is a side view of an example liner with an upper polymer layer and a lower polymer layer.
Figures 24, 25:
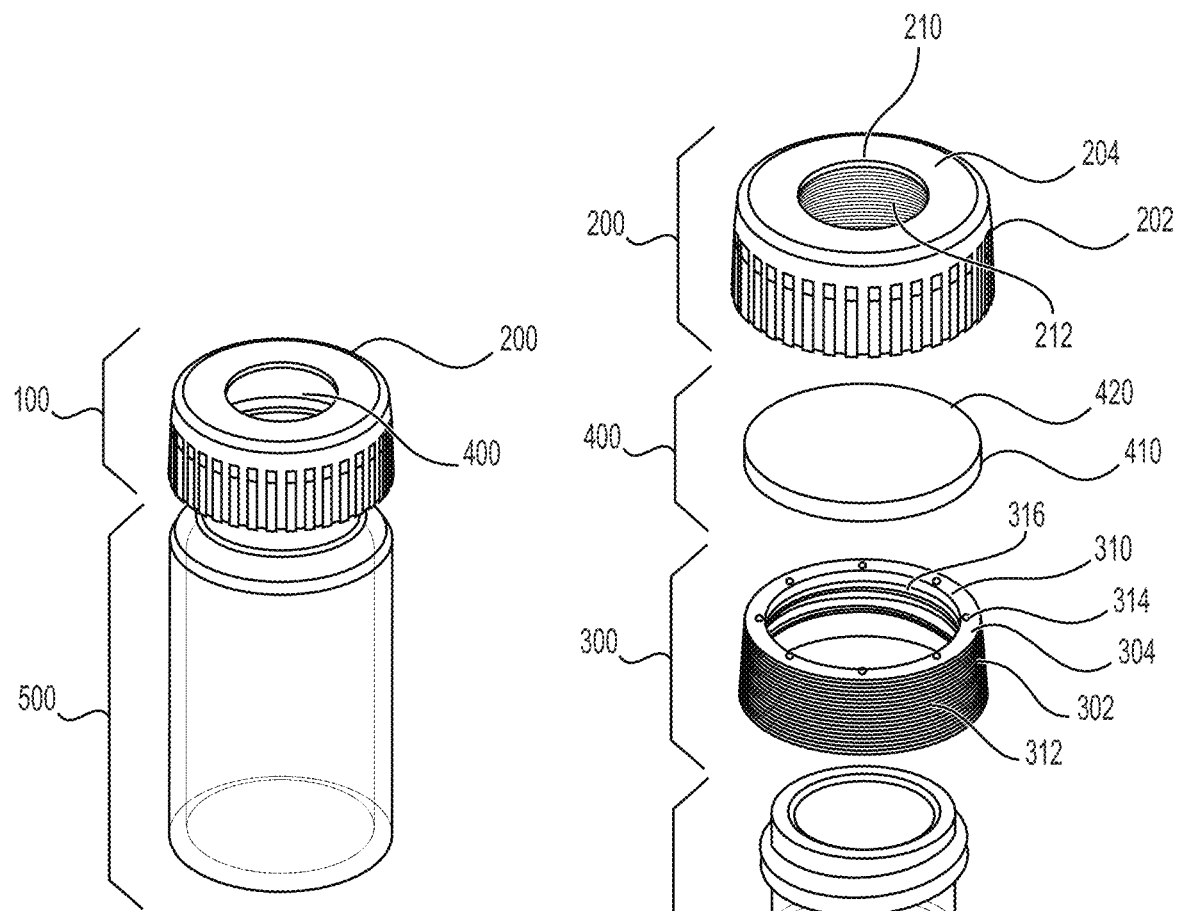
FIG. 24 is an upper perspective view of an example cap and vial assembly.
FIG. 25 is an exploded view of an example cap and vial assembly.

FIGS. 18-22 show the liner (400) according to various implementations. The liner (400) is generally configured to securely seal samples in a container such that the sample is separate from an external environment while simultaneously allowing for extraction of the sample (e.g., via a syringe). In various implementations, the liner (400) includes a septum (410) as shown in FIGS. 18 and 19. In certain implementations, the liner (400) includes a septum (410) and a lower polymer layer (430) disposed on a lower surface of the septum (410), as shown in FIGS. 20 and 21. In certain implementations, the liner (400) includes a septum (410), a lower polymer layer (430) disposed on a lower surface of the septum (410), and an upper polymer layer (420) disposed on an upper surface of the septum (410), as shown in FIGS. 22 and 23.

In some implementations, the liner (400) comprises a septum (410) and a lower polymer layer (430), where the lower polymer layer (430) comprises a first thermoplastic polymer, the septum (410) comprises an elastomer, and the septum (410) is coupled to the lower polymer layer (430). In a further implementations, the liner (400) further comprises an upper polymer layer (420), where the upper polymer layer (420) comprises a second thermoplastic polymer layer and the septum (410) is also coupled to the upper polymer layer (420).

As used herein, a septum (410) refers to a membrane used in techniques for the transfer of substances. In some examples, the septum (410) can be made of a rubber. In further examples, the membrane can be chemically resistant. In specific examples, the septum (410) can be used with a syringe to transfer a substance from, for example, a vial (400) to a gas chromatograph, liquid chromatograph, mass spectrometer, or any combination thereof for separation, purification, and/or identification. A septum (410) can be used when transferring a solid, liquid, gas, or any combination thereof. In further examples, the septum (410) has a top surface and a bottom surface, the bottom surface being opposite and spaced apart from the top surface.

In some examples, the septum (410) comprises an elastomer. Elastomers are any material exhibiting elastic or rubber-like properties and can be natural or synthetic. Elastomeric materials (e.g., materials comprising elastomers) include, but are not limited to, foams and sponges, rubbers, cork products, and any combination thereof. Rubbers include, for example, urethanes, chloroprenes, neoprenes, isoprene rubbers, acrylonitrile butadiene rubbers, ethylene propylene rubbers, fluoroelastomers, silicone rubbers, styrene butadiene rubbers, fluorosilicones, and polyisobutylene rubbers (also referred to as "butyl").

In some examples, the elastomer comprises silicone rubber. Silicone rubber is a durable and resistant elastomer comprising silicone, which comprises silicon, carbon, hydrogen, and oxygen. The silicone rubber comprises a siloxane backbone and an organic moiety bound to the silicon, as per Formula I (where "R" is the organic moiety):

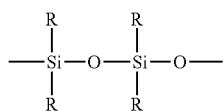

Formula I

Silicone can have a tensile strength of from 500-2500 psi and an elongation percentage of from 450-900%. Silicone is ozone resistant and can withstand low temperatures (e.g., down to −75° F.) and high temperatures (e.g., up to 500° F.). In some examples, the silicone rubber is a room-temperature vulcanizing silicone rubber.

In some examples, the liner (400) further includes a lower polymer layer (430). In further examples, the lower polymer layer (430) comprises a first thermoplastic polymer. In certain examples, the liner (400) further comprises an upper polymer layer (420). In specific examples, the upper polymer layer (420) comprises a second thermoplastic polymer. In some implementations, the first thermoplastic polymer and the second thermoplastic polymer are the same. In further implementations, the first thermoplastic polymer and the second thermoplastic polymer are different.

Thermoplastic polymers, like all polymers, are made up of small molecules, called monomers, which form long chains via the process of polymerization. For example, one thermoplastic polymer chain can comprise thousands of monomers. Thermoplastic polymers include, but are not limited to, polyethylene (PE), polypropylene (PP), polyvinyl chloride (PVC), polystyrene (PS), polyethylene terephthalate (PET), polybutylene terephthalate (PBT), polyamide (PA), and polytetrafluoroethylene (PTFE).

In some implementations, the first thermoplastic polymer and the second thermoplastic polymer comprise polytetrafluoroethylene (PTFE).

In further implementations, the first thermoplastic polymer and the second thermoplastic polymer comprise polypropylene (PP).

In certain implementations, the first thermoplastic polymer comprises PTFE or PP.

In specific implementations, the second thermoplastic polymer comprises PTFE or PP.

In further examples, a liquid disposed on the first thermoplastic polymer has a contact angle of from 0° to 90° with that thermoplastic polymer. In some examples, a liquid disposed on the second thermoplastic polymer has a contact angle of from 0° to 90° with that thermoplastic polymer. Contact angle is a measure of the ability of a liquid to wet the surface of a solid. The contact angle is an angle formed by a liquid at the three-phase boundary where a liquid, gas, and solid intersect. As contact angle decreases, surface energy increases, surface tension decreases, and wettability increases. In some examples, when a contact angle of a liquid with a surface is less than 90°, the wetting of the surface by the liquid is very favorable and the liquid can spread over a large area of the surface. As described herein, a liquid having a contact angle less than 90° with the first and/or thermoplastic polymer can be favorable for bonding that thermoplastic polymer to the elastomer (e.g., for bonding polypropylene or PTFE to silicone).

In some examples, the septum (410) is attached to the lower polymer layer (430). In further examples, the septum (410) is attached to the upper polymer layer (420). In the liner (400), the layer (430) can be attached to the septum (410). The thermoplastic polymer can be coupled to the elastomer using methods known in the art. For example, the layer (430) comprising thermoplastic polymer can be attached to the septum (410) comprising elastomer via the application of compositions such as primers, prime coats, adhesion promoters, or any combination thereof; these coupling compositions can be dilute solutions comprising silane coupling agents, along with other active ingredients. The compositions are generally liquids and enhance the adhesion and bonding of silicones to a variety of substances. In some examples, these substances can include, but are not limited to, Dow Corning® 3-6060, 92-023, S-2260, or any combination thereof.

In some examples, the lower polymer layer (430) has, for example, a third surface and a fourth surface, the fourth surface being opposite and spaced apart from the third surface. In some examples of the liner (400), the septum (410) is disposed on the lower polymer layer (430) comprising the first thermoplastic polymer such that a top surface of the septum (410) is disposed on and in physical contact with the third surface of the lower polymer layer (430) comprising the first thermoplastic polymer. In some examples, the bottom surface of the septum (410) is disposed on the third surface of the lower polymer layer (430) comprising the first thermoplastic polymer. In further examples, the septum (410) can be disposed on a upper polymer layer (420) comprising a second thermoplastic polymer, having, for example, a fifth surface and a sixth surface, the fifth surface being opposite and spaced apart from the sixth surface. In certain examples, the septum (410) is disposed on the upper polymer layer (420) such that a top surface of the septum (410) is disposed on and in physical contact with the fifth surface of the upper polymer layer (420) comprising the second thermoplastic polymer, thus resulting in the septum (410) being sandwiched between the lower polymer layer (430) of the first thermoplastic polymer and the upper polymer layer (420) of the second thermoplastic polymer. In some examples, the septum (410) is disposed on the upper polymer layer (420) such that the bottom surface of the septum (410) is disposed on and in physical contact with the fifth surface of the upper polymer layer (420) comprising the second thermoplastic polymer, thus resulting in the septum (410) being sandwiched between the lower polymer layer (430) of the first thermoplastic polymer and the upper polymer layer (420) of the second thermoplastic polymer.

In some examples, the first thermoplastic polymer and second thermoplastic polymer that comprise the lower polymer layer (430) and upper polymer layer (420), respectively, can be the same thermoplastic polymer, or different thermoplastic polymers. In the examples wherein the second and second thermoplastic polymers are the same, the lower polymer layer (430) and upper polymer layer (420) are interchangeable, such that either the top surface of the septum (410) can be disposed on either the lower polymer layer (430) or upper polymer layer (420).

In some examples, the thermoplastic polymer comprises polytetrafluoroethylene (PTFE). PTFE is a synthetic fluoropolymer of tetrafluoroethylene and has a formula as shown in Formula II. PTFE is hydrophobic, non-wetting, high density and resistant to high temperatures. PTFE can be made via a chemical reaction that includes the following ingredients: fluorspar, hydrofluoric acid, chloroform, and water.

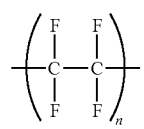

Formula II

In certain examples, the thermoplastic polymer comprises polypropylene. Polypropylene is a thermoplastic polymer derived from propylene monomers and can have a formula as shown in Formula III. Polypropylene can be produced via chain-growth polymerization. Polypropylene can have a melting point of 320° F.

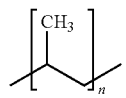

Formula III

In specific examples, the liner (400) is substantially free of perfluoroalkyl and polyfluoroalkyl substances (PFAS). In some examples, the liner (400) is free of PFAS. In some examples, the liner (400) comprises from 0 parts per trillion to 140,000 parts per trillion of PFAS (e.g., 0 to 20,000 parts per trillion, 20,000 to 40,000 parts per trillion, 40,000 to 60,000 parts per trillion, 60,000 to 80,000 parts per trillion, 80,0000 to 100,000 parts per trillion, 100,0000 to 120,000 parts per trillion, or 120,000 to 140,000 parts per trillion). In further examples, the liner (400) comprises 140,000 parts per trillion or less (e.g., up to 140,000 parts per trillion, up to 130,000 parts per trillion, up to 120,000 parts per trillion, up to 110,000 parts per trillion, up to 100,000 parts per trillion, up to 90,000 parts per trillion, up to 80,000 parts per trillion, up to 70,000 parts per trillion, up to 60,000 parts per trillion, up to 50,000 parts per trillion, up to 40,000 parts per trillion, up to 30,000 parts per trillion, up to 20,000 parts per trillion, or up to 10,000 parts per trillion). In certain examples, the liner (400) comprises from 0 parts per trillion to 1,000 parts per trillion (e.g., 0 to 100 parts per trillion, 100 to 200 parts per trillion, 200 to 300 parts per trillion, 300 to 400 parts per trillion, 400 to 500 parts per trillion, 500 to 600 parts per trillion, 600 to 700 parts per trillion, 700 to 800 parts per trillion, 800 to 900 parts per trillion, or 900 to 1,000 parts per trillion). In specific examples, the liner 9104) comprises form 0 parts per trillion to 100 parts per trillion (e.g., 0 to 10 parts per trillion, 10 to 20 parts per trillion, 20 to 30 parts per trillion, 30 to 40 parts per trillion, 40 to 50 parts per trillion, 50 to 60 parts per trillion, 60 to 70 parts per trillion, 70 to 80 parts per trillion, 80 to 90 parts per trillion, or 90 to 100 parts per trillion).

PFAS comprise molecules that are made up of a chain of linked carbon and fluorine atoms. Because of the strength of a carbon-fluorine bond, PFAS can degrade very slowly, or not at all, in the environment. PFAS can be used in nonstick coatings on cookware, stain-resistant clothes and carpets, or firefighting foam, in order to make it more effective. Further, PFAS can be used in industries such as aerospace, automotive, construction, electronics, and military equipment. Currently, more than 9,000 PFAS have been identified. As PFAS can persist in the environment for an unknown amount of time and gradually accumulate and remain in the human body, there has been an increase in the concerns regarding the public health impact of PFAS.

PFAS include, but are not limited to, perfluorooctanoic acid (PFOA), perfluorooctyl sulfonate (PFOS), hexofluoropropylene oxide (HFPO) dimer acid, and their ammonium, sodium, and potassium salts, or any combination thereof. Further examples of PFAS include N-ethyl perfluorooctanesulfonamidoacetic acid, N-methyl perfluorooctanesulfonamidoacetic acid, perfluorobutanesulfonic acid, perfluorodecanoic acid, perfluorododecanoic acid, perfluoroheptanoic acid, perfluorohexanesulfonic acid, perfluorohexanoic acid, and perfluorononanoic acid. In certain examples, PFAS comprise perfluorooctanoic acid (PFOA), perfluorooctane sulfonate (PFOS), or any combination thereof.

In specific examples, the liner (400) can have a thickness and a cross-sectional shape. The cross-sectional shape can, for example, be substantially circular.

In some examples, the liner (400) has an average characteristic dimension. The term "characteristic dimension," as used herein, refers to the largest straight-line distance between two points in the plane of the cross-sectional shape. "Average characteristic dimension" generally refers to the statistical mean characteristic dimension. For example, when the liner has a cross-sectional shape that is substantially circular, the average characteristic dimension can refer to the average diameter, which is used herein interchangeably with "diameter."

In some examples, the liner (400) can have an average characteristic dimension of 8 mm or more, or 9 millimeters (mm) or more (e.g., 10 mm or more, 11 mm or more, 12 mm or more, 13 mm or more, 14 mm or more, 15 mm or more, 16 mm or more, 17 mm or more, 18 mm or more, 19 mm or more, 20 mm or more, 21 mm or more, 22 mm or more, 23 mm or more, 24 mm or more, 25 mm or more, 26 mm or more, 27 mm or more, 28 mm or more, or 29 mm or more, 30 mm or more, 31 mm or more, 32 mm or more, 33 mm or more, 34 mm or more, 35 mm or more, 36 or more, 37 mm or more, 38 mm or more, or 39 mm or more). In some examples, the liner (400) can have an average characteristic dimension of 40 mm or less, 30 mm or less (e.g., 39 mm or less, 38 mm or less, 37 mm or less, 36 mm or less, 35 mm or less, 34 mm or less, 33 mm or less, 32 mm or less, 31 mm or less, or 30 mm or less, 29 mm or less, 28 mm or less, 27 mm or less, 26 mm or less, 25 mm or less, 24 mm or less, 23 mm or less, 22 mm or less, 21 mm or less, 20 mm or less, 19 mm or less, 18 mm or less, 17 mm or less, 16 mm or less, 15 mm or less, 14 mm or less, 13 mm or less, 12 mm or less, 11 mm or less, or 10 mm or less). The average characteristic dimension of the liner (400) can range from any of the minimum values described above to any of the maximum values described above. For example, the liner (400) can have an average characteristic dimension of from 8 millimeters (mm) to 40 mm (e.g., from 9 to 12 mm, from 12 to 15 mm, from 15 to 18 mm, from 18 to 21 mm, from 21 to 24 mm, from 24 to 27 mm, from 27 to 30 mm, from 9 to 15 mm, from 9 to 18 mm, from 9 to 21 mm, from 9 to 24 mm, from 9 to 27 mm, from 9 to 30 mm, from 20 to 22 mm, from 20 to 24 mm, from 20 to 26 mm, from 20 to 28 mm, from 20 to 30 mm, from 22 to 23 mm, from 23 to 24 mm, from 24 to 25 mm, from 25 to 26 mm, from 16 to 18 mm, from 16 to 20 mm, from 16 to 22 mm, from 16 to 24 mm, from 18 to 19 mm, from 19 to 20 mm, from 20 to 21 mm, or from 21 to 22 mm). In further examples, the liner (400) has a diameter of 24 mm. In certain examples, the liner (400) has a diameter of 20 mm.

In some examples, the liner (400) has a thickness of 0.5 inches (in.) or less (e.g., 0.4 in. or less, 0.3 in. or less, 0.2 in. or less, or 0.1 in. or less). In certain examples, the liner (400) has a thickness of from 0 to 0.1 in., 0.1 to 0.2 in., 0.2 to 0.3 in., 0.3 to 0.4 in., or 0.4 to 0.5 inches. In specific examples, the liner (400) has a thickness of from 0 to 0.05 in., 0.05 to 0.1 in., 0.1 to 0.15 in., 0.15 to 0.2 in., 0.2 to 0.25 in., 0.25 to 0.3 in., 0.3 to 0.35 in., 0.35 to 0.4 in., 0.4 to 0.45 in., or 0.45 to 0.5 inches. In some examples, the liner (400) has a thickness of from 0 to 0.1 in., 0 to 0.2 in., 0 to 0.3 in., 0 to 0.4 in., or 0 to 0.5 inches.

Assembly of the Outer Cap, Inner Cap, and Liner

As shown with respect to FIGS. 1-5, the cap assembly (100) is assembled by first disposing the liner (400) within the outer cap's central cavity (206). In the illustrated implementation, an upper surface of the liner (400) engages a lower surface of the outer cap's upper wall (204) within the central cavity (206). In this position, the liner (400) covers the outer cap's upper opening (210) by extending across the upper opening (210) within the central cavity (206).

Figure 5:
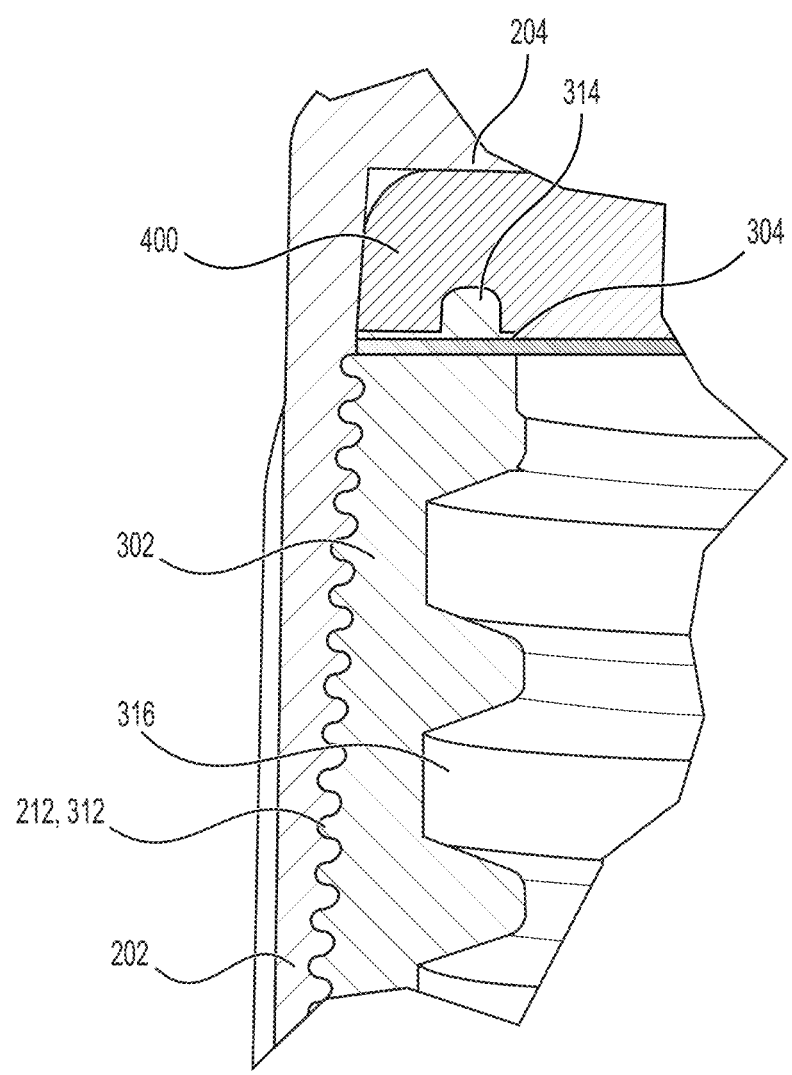
FIG. 5 is an expanded cutaway view of an example cap assembly.

After the liner (400) is inserted into the outer cap (200), the inner cap (300) is next inserted into the outer cap's central cavity (206) via the lower opening (208). The inner cap (300) is inserted upwardly into the central cavity (206) until the inner cap's upper edge (304) engages the lower surface of the liner (400). In this position, the protrusions (314) of the inner cap (300) also engage the liner (400) as depicted in FIG. 5.

When the inner cap (300) is inserted into the outer cap's central cavity (206), the outer cap's inner surface (212) and the inner cap's outer surface (312) engage with one another. As a result, the inner cap (300) is friction fit within the outer cap (200) and thereby secures the liner (400) within the outer cap's central cavity (206) and adjacent the outer cap's upper opening (210). In certain implementations, the liner (400) can be secured within the outer cap (200) in this way without the use of adhesives. In other words, the liner (400) is mechanically secured in place between the outer cap (200) and inner cap (300).

Cap and Vial Assembly

Also provided herein is a cap and vial assembly comprising the cap assembly (100) as disclosed herein and a vial (500), wherein the cap assembly (100) is coupled to the vial (500). FIGS. 24-27 show the cap assembly (100) secured to a vial (500) according to various implementations.

As used herein, a vial (500) is a closable vessel that can hold a solid, liquid, gas, or any combination thereof. A vial (500) can include, but is not limited to, a container, a well plate of any capacity, an ampoule, or a bottle. In some examples, the vial is a 96-well plate. A 96-well plate refers to a plate with multiple (e.g., 96) sample wells, often arranged in a rectangular matrix. A 96-well plate can be used in virology, serology, microbiology, and/or life science and drug discovery applications.

In some examples, the vial (500) can have a volume of from 1 mL to 500 mL (e.g., 1 to 50 mL, 50 to 100 mL, 100 to 150 mL, 150 to 200 mL, 200 to 250 mL, 250 to 300 mL, 300 to 350 mL, 350 to 400 mL, 400 to 450 mL, or 450 to 500 mL).

A vial (500) can be made of any suitable material. For example, the vial (500) can be made of materials that include, but are not limited to, plastic, glass, or any combination thereof. In specific examples, the vial (500) comprises a plastic. Examples of plastics that can be used to make a vial (500) include, but are not limited to, acrylics, high-density polyethylene, or any combination thereof. In some examples, the vial (500) can be made of a pharmaceutical-grade plastic.

In further examples, the vial (500) comprises glass. The glass used to make the vial (500) can include, but is not limited to, soda-lime glass, borosilicate glass, or any combination thereof. In certain examples, the glass comprises borosilicate glass. Borosilicate glass is a type of glass with silica and boron trioxide as the main glass-forming constituents. Borosilicate glasses have low coefficients of thermal expansion (e.g., approximately $3 \times 10^{-6}$ $K^{-1}$ at 20° C.), making them more resistant to thermal shock than any other common glass. Such glass is subjected to less thermal stress and can withstand temperature differentials without fracturing of about 165° C. (300° F.).

In some examples, the vial (500) comprises a second plastic. Examples of plastics that can be used to make a vial (500) include, but are not limited to, acrylics, high-density polyethylene, or any combination thereof. In some examples, the vial (500) can be made of a pharmaceutical-grade plastic.

In some examples, the cap assembly (100) and the vial (500) each independently comprise screw threads (316), such that the cap assembly (100) is configured to be coupled to the vial (500) with a screw mechanism. As used herein, a "screw mechanism" refers to a mechanism wherein a cylindrical shaft with helical grooves around at least a portion of the outside of the shaft, known as threads, passes through a hole in another object or medium with threads on the inside of the hole, wherein the threads on the inside of the hole mesh with threads on the outside of the shaft. In screwing the cap assembly (100) to the vial (500), the cap assembly (100) is sealed to the vial (500) and the contents of the vial (500) are thus sealed within the vial (500), for example to minimize or prevent evaporation and/or contamination.

Method

Method of Analyzing a Sample

Also provided herein, is a method of analyzing a sample using an analytical instrument, wherein the sample is contained within a container comprising the cap assembly (100) as disclosed herein, or the cap and vial assembly as disclosed herein, the method comprising penetrating the liner (400) with a syringe to remove a portion of the sample and testing the portion of the sample using the analytical instrument. In further examples, the sample comprises a biological sample.

In further examples, the method further comprises removing one or more portions of the sample by penetrating the liner (400) with the syringe from 1 to 20 times.

As used herein, a syringe is a reciprocating pump comprising a plunger that fits tightly within a cylindrical tube having a longitudinal axis. The plunger can be linearly translocated (e.g., pulled and/or pushed) axially along the inside of the tube, allowing the syringe to take in and expel liquid or gas through a discharge orifice at an open end of the tube. The open end of the tube can be fitted with, for example, a hypodermic needle, a nozzle, and/or tubing to direct flow into and out of the syringe. As used herein, "syringe" and "needle" are used interchangeably. Further, the syringe can include a syringe or needle as connected to an auto-sampler device, wherein an auto-sampler is a device that automatically loads collected samples into a laboratory instrument (e.g., an analytical instrument), such as a gas chromatograph, liquid chromatograph, mass spectrometer, or any combination thereof. The syringe can be single-use or multi-use.

Further, the syringe can have any suitable size and/or volume. In some examples, the syringe can have a volume of from 1 mL to 50 mL (e.g., 1 mL to 10 mL, 10 mL to 20 mL, 20 mL to 30 mL, 30 mL to 40 mL, or 40 mL to 50 mL). In further examples, the syringe can have a volume of from 1 mL to 25 mL or 25 mL to 50 mL (e.g., 1 mL to 5 mL, 1 mL to 10 mL, 1 mL to 15 mL, 1 mL to 20 mL, 1 mL to 25 mL, 1 mL to 30 mL, 1 mL to 35 mL, 1 mL to 40 mL, 1 mL to 45 mL, or 1 mL to 50 mL).

In some examples, the syringe can have a volume of from 5 to 1000 µL. In further examples, the syringe can have a volume of from 5 to 100, 100 to 200, 200 to 300, 300 to 400, 400 to 500, 500 to 600, 600 to 700, 700 to 800, 800 to 900, or 900 to 1000 µL. In certain examples, the syringe can have a volume of 5 µL or more, 10 µL or more, 25 µL or more, 50 µL or more, 100 µL or more, 250 µL or more, 500 µL or more, or 1000 µL or more. A syringe having a volume of from 5 to 1000 µL can also be referred to as a "micro syringe." In certain examples, the analytical instrument is a gas chromatograph, liquid chromatograph, mass spectrometer, or any combination thereof.

Gas chromatography is an analytical technique used to separate chemical components in a mixture and detect them to determine their presence, absence, and/or concentration. The chemical components subject to detection can include organic molecules or gases. Gas chromatography can be used for quality control in the manufacture of products ranging from cars to chemicals, such as petrochemicals or pharmaceuticals, research, or safety and monitoring of environmental samples, microplastics, or food. Gas chromatography can be performed on a gas chromatograph (GC). A GC operates by transporting the sample molecules from a solid, liquid, and/or gas in a carrier gas through a heated analytical column and into a detector which responds to the chemical components eluting from the column to produce a signal, which is recorded by appropriate software to produce a chromatogram. The sample can be extracted via a syringe and/or an autosampler. When a sample is not a gas, then the chemical components of the sample are first vaporized.

Liquid chromatography is an analytical technique in which the sample ions or molecules are dissolved in a liquid mobile phase. Liquid chromatography can be performed on a liquid chromatograph (LC) which operates by transporting the sample in the liquid mobile phase through a column or plane packed with a stationary phase. Different solutes interact with the stationary phase to different degrees due to differences in ion-exchange, adsorption, partitioning, and/or size, thus separating the compounds. The transit time of the solute through the column is determined based on these differences. The sample can be extracted into the liquid chromatograph via a syringe and/or an autosampler.

Gas chromatographs and/or liquid chromatographs can further be equipped with a mass spectrometer. Mass spectrometry is an analytical tool useful for measuring the mass-to-charge ratio (m/z) of one or more molecules present in a sample. A mass spectrometer (MS) converts individual molecules from a sample into ions so that they can be moved and manipulated by internal electric and magnetic fields. The mass spectrometer comprises three components: the ion source, mass analyzer, and detector. The ion source ionizes the sample. In some examples, the ion source ionizes the sample to cations by loss of an electron. In further examples, the ion source ionized the sample to anions. The mass analyzer sorts and separates the ions according to their mass and charge. The detector measures the separated ions and displays the results on a chart. In some examples, a mass spectrometer may be utilized in tandem with a gas chromatograph and/or liquid chromatograph.

In some examples, the liner (400) is penetrated with the syringe via an auto-sampling device. An auto-sampler is a device that automatically loads collected samples into a laboratory instrument (e.g., an analytical instrument), such as a gas chromatograph, liquid chromatograph, mass spectrometer, or any combination thereof. The syringe can be single-use or multi-use.

Method of Testing Water Quality

The present disclosure, in one aspect, provides for a method of testing water quality in a sample.

Water quality testing can follow various regulations and methods, which can depend on factors such as the designated use of a body of water, the criteria for protecting the designated uses, and the antidegradation requirements for protect existing uses and high quality/high value water. Designated uses of water can include (1) protection and propagation of fish, shellfish, and wildlife, (2) recreation, (3) public drinking water supply, or (4) agricultural, industrial, navigation, and other purposes. Water quality testing can include testing water for pollutants, such as PFAS, as well as other pollutants. In some examples, the criteria for methods of water quality testing can be prescribed by the U.S. Environmental Protection Agent (EPA), European Chemicals Agency (ECHA), Canada's Department of the Environment, state, territory, authorized tribe organization, or any combination thereof. Further, the water quality criteria, such as a maximum concentration level for a pollutant or a description of desired water conditions, can also be prescribed by the above organizations. Example methods of water quality testing of PFAS in drinking water are included in Shoemaker, J. A. and Tettenhorst, D. R., *Method 537.1: Determination of Selected Per-and Polyfluorinated Alkyl Substances in Drinking Water by Solid Phase Extraction and Liquid Chromatography/Tandem Mass Spectrometry (LC/MS/MS)*, EPA Document #: EPA/600/R-18/352, Version 1.0. November 2018.

For example, the present disclosure, in one aspect, provides for a method of testing water quality in a sample using an analytical instrument, wherein the sample is contained within a container comprising the cap assembly (100) as disclosed herein, or the cap and vial assembly as disclosed herein, the method comprising penetrating the liner (400) with a syringe to remove a portion of the sample and testing the portion of the sample using the analytical instrument.

As used herein, a syringe is a reciprocating pump comprising a plunger that fits tightly within a cylindrical tube having a longitudinal axis. The plunger can be linearly translocated (e.g., pulled and/or pushed) axially along the inside of the tube, allowing the syringe to take in and expel liquid or gas through a discharge orifice at an open end of the tube. The open end of the tube can be fitted with, for example, a hypodermic needle, a nozzle, and/or tubing to direct flow into and out of the syringe. As used herein, "syringe" and "needle" are used interchangeably. Further, the syringe can include a syringe or needle as connected to an auto-sampler device, wherein an auto-sampler is a device that automatically loads collected samples into a laboratory instrument (e.g., an analytical instrument), such as a gas chromatograph, liquid chromatograph, mass spectrometer, or any combination thereof. The syringe can be single-use or multi-use.

Further, the syringe can have any suitable size and/or volume. In some examples, the syringe can have a volume of from 1 mL to 50 mL (e.g., 1 mL to 10 mL, 10 mL to 20 mL, 20 mL to 30 mL, 30 mL to 40 mL, or 40 mL to 50 mL). In further examples, the syringe can have a volume of from 1 mL to 25 mL or 25 mL to 50 mL (e.g., 1 mL to 5 mL, 1 mL to 10 mL, 1 mL to 15 mL, 1 mL to 20 mL, 1 mL to 25 mL, 1 mL to 30 mL, 1 mL to 35 mL, 1 mL to 40 mL, 1 mL to 45 mL, or 1 mL to 50 mL).

In some examples, the syringe can have a volume of from 5 to 1000 µL. In further examples, the syringe can have a volume of from 5 to 100, 100 to 200, 200 to 300, 300 to 400, 400 to 500, 500 to 600, 600 to 700, 700 to 800, 800 to 900, or 900 to 1000 µL. In certain examples, the syringe can have a volume of 5 µL or more, 10 µL or more, 25 µL or more, 50 µL or more, 100 µL or more, 250 µL or more, 500 µL or more, or 1000 µL or more. A syringe having a volume of from 5 to 1000 µL can also be referred to as a "micro syringe."

In some examples, the analytical instrument is a gas chromatograph, liquid chromatograph, mass spectrometer, or any combination thereof.

In further examples, the method comprises removing one or more portions of the sample by penetrating the liner (400) with the syringe one or more times (e.g., 2 or more, 3 or more, 4 or more, 5 or more, 6 or more, 7 or more, 8 or more, 9 or more, 10 or more, 11 or more, 12 or more, 13 or more, 14 or more, 15 or more, 16 or more, 17 or more, 18 or more, or 19 or more). In some examples, the method comprises removing one or more portions of the sample by penetrating the liner (400) with the syringe 20 times or less (e.g., 19 or less, 18 or less, 17 or less, 16 or less, 15 or less, 14 or less, 13 or less, 12 or less, 11 or less, 10 or less, 9 or less, 8 or less, 7 or less, 6 or less, 5 or less, 4 or less, 3 or less, or 2 or less). The number of times the liner is penetrated (and accordingly the number of portions of sample removed) can range from any of the minimum values described above to any of the maximum values described above. For example, the methods can comprise removing one or more portions of the sample by penetrating the liner (400) with the syringe from 1 to 20 times.

Other advantages which are obvious, and which are inherent to the invention, will be evident to one skilled in the art. It will be understood that certain features and sub-combinations are of utility and may be employed without reference to other features and sub-combinations. This is contemplated by and is within the scope of the claims. Since many possible implementations may be made of the invention without departing from the scope thereof, it is to be understood that all matter herein set forth or shown in the accompanying drawings is to be interpreted as illustrative and not in a limiting sense.

What is claimed is:

1. A cap assembly for use with a vial, the cap assembly comprising:
   an outer cap defining a central cavity, an upper opening, and a lower opening;
   an inner cap defining a central cavity, wherein the inner cap is secured at least partially within the outer cap's central cavity; and
   a liner disposed within the outer cap's central cavity between the outer cap's upper opening and an upper edge of the inner cap, wherein the liner extends across the outer cap's upper opening;
   wherein the upper edge of the inner cap includes one or more protrusions configured to engage the liner.

2. The cap assembly of claim 1, wherein an outer surface of the inner cap is configured to engage an inner surface of the outer cap to secure the inner cap at least partially within the outer cap.

3. The cap assembly of claim 2, wherein the inner cap is friction fit at least partially within the outer cap.

4. The cap assembly of claim 3, wherein the outer surface of the inner cap comprises an outer knurled surface, wherein the inner surface of the outer cap comprises a inner knurled surface, and wherein the inner cap's outer knurled surface is configured to engage the outer cap's inner knurled surface to friction fit the inner cap at least partially within the outer cap.

5. The cap assembly of claim 4, wherein the outer knurled surface of the inner cap is knurled with a plurality of annular rings, and wherein the inner knurled surface of the outer cap is knurled with a plurality of annular rings.

6. The cap assembly of claim 1, wherein the outer cap comprises a sidewall defining the outer cap's central cavity, and wherein the outer cap further comprises an upper wall positioned at an upper end of the outer cap, wherein the outer cap's upper opening comprises an aperture in the outer cap's upper wall.

7. The cap assembly of claim 6, wherein the liner is disposed between the upper wall of the outer cap and the upper edge of the inner cap.

8. The cap assembly of claim 1, wherein a diameter of the outer cap's upper opening is less than the diameter of the outer cap's lower opening.

9. The cap assembly of claim 1, wherein the inner cap's central cavity comprises a cylindrical central cavity.

10. The cap assembly of claim 1, wherein the outer cap's central cavity comprises a cylindrical central cavity.

11. The cap assembly of claim 1, wherein an inner surface of the inner cap is threaded.

12. The cap assembly of claim 1, wherein the liner comprises a septum and a lower polymer layer, wherein the lower polymer layer comprises a first thermoplastic polymer, wherein the septum comprises an elastomer, and wherein the septum is coupled to the lower polymer layer.

13. The cap assembly of claim 12, wherein the elastomer comprises silicone rubber.

14. The cap assembly of claim 12, wherein the liner further comprises an upper polymer layer, wherein the upper polymer layer comprises a second thermoplastic polymer, further wherein the septum is coupled to the upper polymer layer.

15. The cap assembly of claim 14, wherein the first thermoplastic polymer and the second thermoplastic polymer are the same.

16. The cap assembly of claim 14, wherein the first thermoplastic polymer and the second thermoplastic polymer are different.

17. The cap assembly of claim 12, wherein a liquid disposed on the first thermoplastic polymer has a contact angle of from 0° to 90° with the first thermoplastic polymer.

18. The cap assembly of claim 14, wherein a liquid disposed on the second thermoplastic polymer has a contact angle of from 0° to 90° with the second thermoplastic polymer.

19. The cap assembly of claim 14, wherein the first thermoplastic polymer and the second thermoplastic polymer comprise polytetrafluoroethylene (PTFE).

20. The cap assembly of claim 14, wherein the first thermoplastic polymer and the second thermoplastic polymer comprise polypropylene (PP).

21. The cap assembly of claim 12, wherein the first thermoplastic polymer comprises PTFE or PP.

22. The cap assembly of claim 14, wherein the second thermoplastic polymer comprises PTFE or PP.

23. The cap assembly of claim 12, wherein the liner has a thickness and a cross-sectional shape, wherein the cross-sectional shape is substantially circular.

24. The cap assembly of claim 1, wherein the liner has an average characteristic dimension of from 8 millimeters (mm) to 40 mm.

25. The cap assembly of claim 12, wherein the liner is free of perfluoroalkyl and polyfluoroalkyl substances (PFAS).

26. The cap assembly of claim 12, wherein the liner is substantially free of PFAS.

27. The cap assembly of claim 12, wherein the liner comprises from 0 parts per trillion to 140,000 parts per trillion of PFAS.

28. The cap assembly of claim 12, wherein the liner has a thickness of from 0.5 inches or less.

\* \* \* \* \*